(12) United States Patent
Nishizawa et al.

(10) Patent No.: US 9,441,286 B2
(45) Date of Patent: Sep. 13, 2016

(54) OIL-IMPREGNATED SINTERED BEARING AND PRODUCTION METHOD THEREFOR

(71) Applicant: HITACHI POWDERED METALS CO., LTD., Matsudo-shi, Chiba (JP)

(72) Inventors: Naoki Nishizawa, Kashiwa (JP); Hidekazu Tokushima, Kashiwa (JP); Takeshi Yanase, Matsudo (JP)

(73) Assignee: HITACHI POWDERED METALS CO., LTD., Chiba (JP)

( * ) Notice: Subject to any disclaimer, the term of this patent is extended or adjusted under 35 U.S.C. 154(b) by 663 days.

(21) Appl. No.: 13/656,121

(22) Filed: Oct. 19, 2012

(65) Prior Publication Data

US 2013/0101244 A1 Apr. 25, 2013

(30) Foreign Application Priority Data

Oct. 24, 2011 (JP) ................. 2011-232629

(51) Int. Cl.
| | |
|---|---|
| *F16C 33/10* | (2006.01) |
| *B22F 3/11* | (2006.01) |
| *C22C 9/00* | (2006.01) |
| *C22C 38/16* | (2006.01) |
| *C22C 9/02* | (2006.01) |
| *B22F 3/26* | (2006.01) |
| *B22F 5/10* | (2006.01) |
| *C22C 1/08* | (2006.01) |
| *C22C 1/10* | (2006.01) |
| *C22C 33/02* | (2006.01) |
| *F16C 33/12* | (2006.01) |
| *F16C 33/14* | (2006.01) |
| *C22C 38/00* | (2006.01) |

(52) U.S. Cl.
CPC . *C22C 9/00* (2013.01); *B22F 3/26* (2013.01);
*B22F 5/10* (2013.01); *C22C 1/08* (2013.01);
*C22C 1/10* (2013.01); *C22C 9/02* (2013.01);
*C22C 33/0207* (2013.01); *C22C 33/0214*
(2013.01); *C22C 33/0242* (2013.01); *C22C*
*33/0278* (2013.01); *C22C 38/002* (2013.01);
*C22C 38/008* (2013.01); *C22C 38/16*
(2013.01); *F16C 33/104* (2013.01); *F16C*
*33/128* (2013.01); *F16C 33/145* (2013.01);
*F16C 2202/10* (2013.01); *F16C 2204/10*
(2013.01); *F16C 2220/20* (2013.01)

(58) Field of Classification Search
CPC ......... C22C 38/16; C22C 33/02; B22F 3/16;
B22F 3/00
See application file for complete search history.

(56) References Cited

U.S. PATENT DOCUMENTS 7,553,445 B2    6/2009  Miyasaka

FOREIGN PATENT DOCUMENTS

| GB | 2220421 A | * | 1/1990 |
|---|---|---|---|
| JP | A-2003-120674 | | 4/2003 |
| JP | A-2005-082867 | | 3/2005 |

* cited by examiner

*Primary Examiner* — Keith Walker
*Assistant Examiner* — Stephani Hill
(74) *Attorney, Agent, or Firm* — Oliff PLC

(57) ABSTRACT

An oil-impregnated sintered bearing which does not tend to produce squealing noises is provided. The oil-impregnated sintered bearing can be used as a bearing of an electric motor that may be intermittently used for a short time, such as a bearing of a window regulator motor. The oil-impregnated sintered bearing includes pores that include middle-sized pores with circle-equivalent diameters of 45 to 63 μm at 0.9 to 2.5%, interparticle pores with circle-equivalent diameters of 63 to 75 μm at 0.1 to 1.2%, and large interparticle pores with circle-equivalent diameters of larger than 75 μm at not more than 3%, with respect to the total number of the pores.

6 Claims, 1 Drawing Sheet

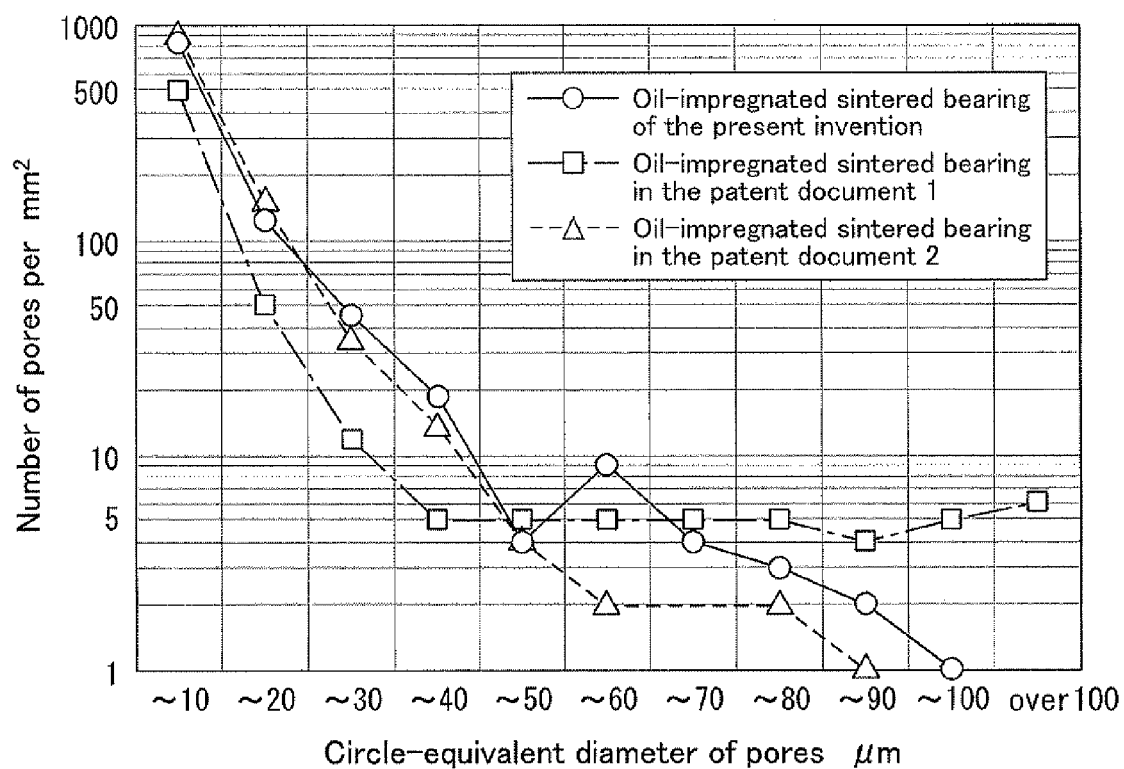

OIL-IMPREGNATED SINTERED BEARING AND PRODUCTION METHOD THEREFOR

BACKGROUND OF THE INVENTION

1. Technical Field

The present invention relates to an oil-impregnated sintered bearing and to a production method therefor. In particular, the present invention relates to an oil-impregnated sintered bearing for an electric motor, which may be mounted in an automobile or the like and is suitably used in cold climates, and relates to a production method therefore.

2. Background Art

Oil-impregnated sintered bearings are made such that a bearing body is formed of a porous sintered compact and a lubricating oil is impregnated into pores of the sintered compact. Therefore, the oil-impregnated sintered bearings can be used for a long time without providing additional oil. For this advantage, the oil-impregnated sintered bearings are applied in various bearing devices and have also been used as bearings for various electric motors in manufacturing of automobiles. The electric motors are arranged in interior space of automobiles, and therefore, it is undesirable if noise, so-called "squealing noises" are generated by metallic contact between a shaft and an inner circumferential surface of a bearing during sliding. In this regard, various means for preventing generation of the squealing noises have been developed.

According to the inventions disclosed in Japanese Patent Applications of Laid-open Nos. 2003-120674 (patent document 1) and 2005-082867 (patent document 2), the following oil-impregnated sintered bearings are provided. These oil-impregnated sintered bearings do not produce the squealing noises even when used in cold climates that reach a temperature of, for example, 20° C. below zero or 30° C. below zero. These oil-impregnated sintered bearings are formed with conflicting characteristics in which an open porosity is high but fluid permeability is low, thereby preventing generation of the squealing noises. The fluid permeability affects leakage characteristics of lubricating oil and oil pressure of a sliding surface. Therefore, an oil-impregnated sintered bearing with high fluid permeability tends to produce the squealing noises during sliding in cold climates. On the other hand, when the fluid permeability is decreased by increasing the density of an oil-impregnated sintered bearing, the number of the pores is decreased. As a result, the open porosity is decreased, and oil-retaining characteristics are degraded. Accordingly, when the open porosity is increased in order to improve the oil-retaining characteristics, the fluid permeability is increased. Thus, the fluid permeability and the open porosity are in a trade-off relationship, and it is difficult to increase the open porosity (oil-retaining characteristics) and to decrease the fluid permeability at the same time.

In regard to this problem, in the inventions disclosed in the patent documents 1 and 2, by using a porous reduced iron powder as an iron powder, an enormous number of microscopic pores are arranged in an iron phase of the oil-impregnated sintered bearing, whereby the open porosity is increased. Thus, while the fluid permeability is maintained to be low, the open porosity is increased, and the problem of the conflicting characteristics of the fluid permeability and the open porosity is overcome. Accordingly, oil-impregnated sintered bearings that do not produce the squealing noises even when used in cold climates are provided.

Specifically, the oil-impregnated sintered bearing disclosed in the patent document 1 is made of a sintered alloy having a cross sectional structure in which Cu alloy phase containing Sn and P and ferrite phase are mixed at approximately equal amounts by area ratio. The sintered alloy includes not more than 0.7 mass % of graphite particles and includes pores with an open porosity of 20 to 30%. The pores are impregnated with a synthetic oil with a kinetic viscosity of 61.2 to 74.8 mm$^2$/s (cSt) at 40° C. The oil-impregnated sintered bearing is sized and has an inner circumferential surface at which iron portion is exposed at 2 to 6% by area ratio. The oil-impregnated sintered bearing has a fluid permeability of 6 to 50×10$^{-11}$ cm$^2$.

On the other hand, the oil-impregnated sintered bearing disclosed in the patent document 2 is produced by compacting and sintering a mixed powder of an iron powder and one of a copper powder and a copper alloy powder. In this method, a part of the amount or the entirety of the iron powder is a porous iron powder. The porous iron powder is made of particles which include numerous microscopic pores from the surface to the inside thereof and thereby have spongelike appearances. The porous iron powder particles have sizes of not more than 177 μm and pass through a sieve of 80 mesh. The porous iron powder has a specific surface area of 110 to 500 m$^2$/kg that is measured by a gas adsorption method.

The oil-impregnated sintered bearings disclosed in the patent documents 1 and 2 are suitably used as bearings for blowers of car air-conditioners, for example. In contrast, when these oil-impregnated sintered bearings are used as bearings of window regulator motors so as to open and close the windows of automobiles, they produce squealing noises even at ordinary temperatures. In regard to the car air-conditioner, when once it is turned on, it may be used continuously for a while. Therefore, after the car air-conditioner is started, sufficient amount of lubricating oil is supplied, and an oil film is reliably formed between a shaft and an inner circumferential surface of the bearing. On the other hand, the window is operated for only a short time and is intermittently used. Therefore, the window is stopped before sufficient amount of lubricating oil is supplied and an oil film is reliably formed between a shaft and an inner circumferential surface of the bearing. Accordingly, the oil film is not sufficiently formed between the shaft and the inner circumferential surface of the bearing at any time.

SUMMARY OF THE INVENTION

The present invention has been completed in view of these circumstances, and an object of the present invention is to provide an oil-impregnated sintered bearing and a production method therefor. The oil-impregnated sintered bearing does not tend to produce squealing noises even when used as a bearing of an electric motor which may be intermittently used for a short time, such as a bearing of a window regulator motor.

The oil-impregnated sintered bearings disclosed in patent documents 1 and 2 include pores of the following two kinds. That is, one kind of the pores is pores that are formed as spaces among the powder particles, which are included in ordinary sintered alloys (hereinafter called "interparticle pores"). The other kind is pores that are formed by the spongelike porous iron powder and that are dispersed within iron phases (iron portions) in the sintered alloy (hereinafter called "microscopic pores"). The interparticle pores are relatively large and greatly affect the fluid permeability of the oil-impregnated sintered bearing. On the other hand, the microscopic pores have a small effect on the fluid permeability of the oil-impregnated sintered bearing because a small number of the microscopic pores communicate with each other, but the other greater number of the microscopic pores do not communicate with each other.

In order to smoothly slide a shaft on an inner circumferential surface of the bearing, it is necessary to prevent metallic contact therebetween by forming a preferable oil film therebetween and holding the shaft with the oil film pressure. If the fluid permeability of the bearing is high, the lubricating oil may leak, and a preferable oil film may not be formed. In view of this, in the inventions disclosed in the patent documents 1 and 2, the fluid permeability is decreased by reducing the number of the interparticle pores, thereby improving capability of forming the oil film. Since the fluid permeability is decreased, the amount of the lubricating oil supplied from the interparticle pores is decreased. Therefore, in the inventions disclosed in the patent documents 1 and 2, the microscopic pores are arranged so as to increase the open porosity and increase the oil-retaining characteristics. Thus, the amount of the lubricating oil, which is necessary to form a preferable oil film, is retained in the bearing.

However, the lubricating oil tends to be not sufficiently provided to form a preferable oil film between a shaft and an inner circumferential surface of the bearing. This is because when an electric motor is not run, the lubricating oil impregnated in the microscopic pores within the iron phase of the sintered alloy is decreased in the volume and is drawn into the microscopic pores by capillary action. Accordingly, when the electric motor is started, the lubricating oil on the inner circumferential surface of the bearing is insufficient, and metallic contact occurs, which produces the squealing noises.

In this regard, the inventors of the present invention focused on the sizes of the interparticle pores, and they conducted intensive research based on the following idea and completed the present invention. That is, by arranging interparticle pores with appropriate sizes, lubricating oil may be sufficiently provided at the starting of an electric motor without increasing the fluid permeability of the bearing. Accordingly, a preferable oil film may be formed at the starting of the electric motor.

The present invention is based on the oil-impregnated sintered bearing which has a high open porosity and high oil-retaining characteristics and which is disclosed in the patent document 2. The essential feature of the present invention is that middle-sized pores and large-sized pores are used. For the middle-sized pores, interparticle pores with circle-equivalent diameters of 45 to 63 µm and interparticle pores with circle-equivalent diameters of 63 to 75 µm are arranged at 0.9 to 2.5% and at 0.1 to 1.2% with respect to the total number of the pores, respectively. For the large-sized pores, interparticle pores with circle-equivalent diameters of larger than 75 µm are formed so as to be not more than 3% with respect to the total number of the pores. By arranging the middle-sized interparticle pores and controlling the number of the large-sized interparticle pores, pores for supplying the lubricating oil are arranged without increasing the fluid permeability of the bearing. As a result, the lubricating oil is sufficiently supplied at the starting of the electric motor even in cold climates, and a reliable oil film is formed between the shaft and the inner circumferential surface of the bearing.

The differences of the oil-impregnated sintered bearing of the present invention from the oil-impregnated sintered bearings disclosed in the patent documents 1 and 2 are shown in FIG. 1. As shown in FIG. 1, the oil-impregnated sintered bearing in the patent document 1 includes a great number of microscopic pores. In this oil-impregnated sintered bearing, the number of pores with circle-equivalent diameters of larger than 90 µm is relatively large, and even pores with circle-equivalent diameters of larger than 100 µm. exist. On the other hand, the oil-impregnated sintered bearing in the patent document 2 includes a greater number of microscopic pores compared with the oil-impregnated sintered bearing in the patent document 1. The oil-impregnated sintered bearing in the patent document 2 does not include large pores that have circle-equivalent diameters of larger than 90 µm. In the oil-impregnated sintered bearing of the present invention, the number of the microscopic pores is increased as in the case of the patent document 2. In addition, the number of large pores with circle-equivalent diameters of larger than 90 µm is decreased while the large pores with circle-equivalent diameters of larger than 100 µm are not formed, thereby decreasing the fluid permeability. Moreover, middle-sized pores with circle-equivalent diameters of approximately 45 to 75 µm are formed at a predetermined number. Thus, while the fluid permeability is not increased, the supply of the lubricating oil is performed by the middle-sized pores.

Specifically, the present invention provides an oil-impregnated sintered bearing made of an iron-copper sintered alloy which essentially consists of, by mass %, 10 to 59% of Cu, 1 to 3% of Sn, 0.12 to 0.96% of P, and the balance of Fe and inevitable impurities. The oil-impregnated sintered bearing includes pores in a matrix of the iron-copper sintered alloy at a total of not less than 800 per $mm^2$. The oil-impregnated sintered bearing has an inner circumferential surface at which the pores are exposed at 20 to 50% by area ratio and has a fluid permeability of 1 to $30 \times 10^{-11}$ $cm^2$, and it exhibits the following pore size distribution. That is, the number of pores with circle-equivalent diameters of larger than 75 µm is not more than 3% with respect to the total number of the pores, and the number of pores with circle-equivalent diameters of 63 to 75 µm is 0.1 to 1.2% with respect to the total number of the pores. In addition, the number of pores with circle-equivalent diameters of 45 to 63 µm is 0.9 to 2.5% with respect to the total number of the pores, and the remainder of the pores are pores with circle-equivalent diameters of less than 45 µm.

The oil-impregnated sintered bearing of the present invention may further include at least one of Zn and Ni at not more than 5 mass %.

Moreover, the oil-impregnated sintered bearing of the present invention may include at least one kind of solid lubricant component that is selected from the group consisting of graphite, molybdenum disulfide, manganese sulfide, and calcium fluoride. The solid lubricant component is dispersed in the pores in the matrix of the iron-copper sintered alloy at 0.2 to 2 mass parts with respect to 100 mass parts of the iron-copper sintered alloy.

The present invention also provides a production method for an oil-impregnated sintered bearing having the above pore size distribution, and the production method has the following essential features. That is, a copper-phosphorus alloy powder is used, and it has a particle size distribution so as to consist of not more than 5% of particles larger than 200 sieve mesh, 2 to 10% of particles smaller than 200 sieve mesh and larger than 240 sieve mesh, 10 to 50% of particles smaller than 240 sieve mesh and larger than 325 sieve mesh, and the remainder of particles smaller than 325 sieve mesh. The copper-phosphorus alloy powder generates a liquid phase by sintering and flows out, thereby forming melt-off pores (Kirkendall voids). By using such melt-off pores, the middle-sized interparticle pores are formed.

It should be noted that particles smaller than nnn sieve mesh are particles that pass through a sieve of nnn mesh, and particles larger than mmm sieve mesh are particles that do not pass through a sieve of mmm mesh. For example, the particles smaller than 240 sieve mesh and larger than 325 sieve mesh pass through a sieve of 240 mesh and do not pass through a sieve of 325 mesh.

Specifically, the production method for the oil-impregnated sintered bearing of the present invention includes preparing a raw powder by mixing an iron powder, a copper powder, a copper-phosphorus alloy powder, and at least one of a tin powder and a copper-tin alloy powder. The method also includes compacting the raw powder into a green compact with a density of 5.5 to 6.8 $Mg/m^3$ and with an approximately cylindrical shape and includes sintering the green compact. The raw powder consists of, by mass %, 10 to 59% of Cu, 1 to 3% of Sn, 0.12 to 0.96% of P, and the balance of Fe and inevitable impurities. The iron powder is made of porous iron particles and has a specific surface area of 110 to 500 $m^2/kg$ that is measured by a gas adsorption method. The porous iron powder particles include numerous microscopic pores from the surface to the inside thereof and thereby have spongelike appearances, and they are smaller than 80 sieve mesh. The copper-phosphorus alloy powder consists of 4 to 12 mass % of P and the balance of Cu and inevitable impurities. The copper-phosphorus alloy powder has a particle size distribution so as to consist of not more than 4% of particles larger than 200 sieve mesh, 2 to 10% of particles smaller than 200 sieve mesh and larger than 240 sieve mesh, 10 to 50% of particles smaller than 240 sieve mesh and larger than 325 sieve mesh, and particles smaller than 325 sieve mesh as the remainder. The tin powder and the copper-tin alloy powder are made of particles smaller than 325 sieve mesh. The copper powder is made of beaten-copper particles smaller than 100 sieve mesh or is made of not less than 2 mass % of the beaten-copper particles and the remainder of electrolytic copper particles smaller than 200 sieve mesh. The sintering is performed at a sintering temperature of 760 to 810° C.

In the production method for the oil-impregnated sintered bearing of the present invention, the raw powder may be mixed with at least one of a copper-zinc alloy powder and a copper-nickel alloy powder so as to further include at least one of Zn and Ni at not more than 5 mass %.

In addition, in the production method for the oil-impregnated sintered bearing of the present invention, at least one powder of solid lubricant component may be added at 0.2 to 2 mass parts with respect to 100 mass parts of the raw powder. The powder of solid lubricant component is selected from the group consisting of a graphite powder, a molybdenum disulfide powder, a manganese sulfide powder, and a calcium fluoride powder.

According to the present invention, an oil-impregnated sintered bearing which does not tend to produce the squealing noises is provided. In the oil-impregnated sintered bearing, lubricating oil is sufficiently supplied and a reliable oil film is formed at the starting of an electric motor. Therefore, the oil-impregnated sintered bearing can be used as a bearing of an electric motor which may be intermittently used for a short time, such as a bearing of a window regulator motor.

BRIEF DESCRIPTION OF THE DRAWING

FIG. 1 is a graph that shows pore size distributions of an example of an oil-impregnated sintered bearing of the present invention and conventional oil-impregnated sintered bearings.

PREFERRED EMBODIMENTS OF THE INVENTION (1) Oil-impregnated Sintered Bearing
(1-1) Composition of Sintered Alloy As the sintered alloy forming the oil-impregnated sintered bearing, an iron-copper sintered alloy is used. The iron-copper sintered alloy consists of, by mass %, 10 to 59% of Cu, 1 to 3% of Sn, 0.12 to 0.96% of P, and the balance of Fe and inevitable impurities. The iron-copper sintered alloy exhibits a metallic structure that is formed of an iron phase, a copper alloy (Cu—Sn—P alloy) phase, and pores (interparticle pores and microscopic pores).

Fe is added in the form of a porous iron powder, which will be described later. The porous iron powder forms the iron phase and improves strength of the bearing. Due to the porous iron powder, microscopic pores are dispersed within the iron phase, whereby the open porosity is increased, and the oil-retaining characteristics are improved.

Cu forms a soft copper alloy (Cu—Sn—P) phase and improves adaptability to a shaft and seize resistance. If the amount of Cu is less than 10 mass % in the overall composition, these effects are not sufficiently obtained. On the other hand, if the amount of Cu is greater than 59 mass % in the overall composition, the amount of Fe is decreased, whereby the amount of the iron phase is decreased and the number of the microscopic pores dispersed in the iron phase is decreased. As a result, the open porosity is decreased, and the oil-retaining characteristics are degraded. For these reasons, the amount of Cu is set to be 10 to 59 mass % in the overall composition.

Sn generates a eutectic liquid phase in conjunction with Cu and thereby facilitates the sintering. In addition, Sn alloys with Cu and thereby strengthens the copper alloy phase and improves wear resistance of the copper alloy phase. If the amount of Sn is less than 1 mass % in the overall composition, these effects are not sufficiently obtained. On the other hand, if the amount of Sn is greater than 3 mass % in the overall composition, the copper alloy phase is too hardened, and the adaptability to a shaft is decreased. Accordingly, the amount of Sn is set to be 1 to 3 mass % in the overall composition.

P is added in the form of a copper-phosphorus alloy powder, which will be described later. The copper-phosphorus alloy powder forms middle-sized interparticle pores. Moreover, P alloys with Sn and Cu and thereby strengthens the copper alloy phase and improves the wear resistance of the copper alloy phase. If the amount of P is less than 0.12 mass % in the overall composition, these effects are not sufficiently obtained. On the other hand, if the amount of P is greater than 0.96 mass % in the overall composition, the number of the interparticle pores is too increased, whereby the fluid permeability of the bearing is increased, and decreasing of oil pressure easily occurs. Accordingly, the amount of P is set to be 0.12 to 0.96 mass % in the overall composition.

Zn and Ni strengthen the copper alloy phase and improve the wear resistance of the copper alloy phase, and therefore, at least one of Zn and Ni may be added to the overall composition. In this case, if the amounts of Zn and Ni are excessive, the bearing tends to wear away a shaft easily. Accordingly, in a case of adding at least one of Zn and Ni to the overall composition, they are added so as to be not more than 5 mass %.

(1-2) Area Ratio of Pores

The area ratio of the pores exposed at the inner circumferential surface of the bearing is set to be in a range of 20 to 50%. If the area ratio of the pores exposed at the inner circumferential surface of the bearing is less than 20%, the number of the pores is small, and lubricating effect is not sufficiently obtained. On the other hand, if the area ratio of the pores exposed at the inner circumferential surface of the bearing is greater than 50%, the strength of the oil-impregnated sintered bearing is greatly decreased.

(1-3) Fluid Permeability

The fluid permeability of the oil-impregnated sintered bearing is closely related to sliding noises. The relationship between the fluid permeability and noise level is approximated by a quadratic function, and if the fluid permeability is high, the noise level is also high. Therefore, the fluid permeability of the oil-impregnated sintered bearing is set to be not more than $30 \times 10^{-11}$ cm$^2$. Meanwhile, the fluid permeability of the oil-impregnated sintered bearing affects capability of supplying the lubricating oil. If the fluid permeability is less than $1 \times 10^{-11}$ cm$^2$, the lubricating oil is not smoothly supplied, whereby preferable sliding characteristics are not obtained. Accordingly, the fluid permeability of the oil-impregnated sintered bearing is set to be 1 to $30 \times 10^{-11}$ cm$^2$.

(1-4) Total Number of Pores

If the total number of the pores (interparticle pores and microscopic pores) exposed at the inner circumferential surface of the oil-impregnated sintered bearing is too small, the open porosity is decreased. As a result, the oil-retaining characteristics are degraded, and the capability of supplying the lubricating oil is decreased. Therefore, the total number of the pores is set to be not less than 800 per mm$^2$.

(1-5) Pore Size Distribution

Most of the pores exposed at the inner circumferential surface of the oil-impregnated sintered bearing are microscopic pores, by which the open porosity is increased and the oil-retaining characteristics are thereby improved. If the interparticle pores are also reduced in size in order to decrease the fluid permeability, the capability of supplying the lubricating oil is decreased, whereby the lubricating oil is not sufficiently supplied, and a preferable oil film is not reliably formed. Therefore, middle-sized pores are arranged so as to increase the capability of supplying the lubricating oil without increasing the fluid permeability, whereby the generation of the squealing noises in cold climates is prevented.

The middle-sized pores are formed as the interparticle pores so as to include pores with circle-equivalent diameters of 45 to 63 μm at 0.9 to 2.5% and pores with circle-equivalent diameters of 63 to 75 μm at 0.1 to 1.2%, with respect to the total number of the pores, respectively. The circle-equivalent diameter is a diameter of a circle which has the same area as an area of one pore. If the number of the pores with the circle-equivalent diameters of 45 to 63 μm is less than 0.9% and the number of the pores with the circle-equivalent diameters of 63 to 75 μm is less than 0.1%, with respect to the total number of the pores, respectively, the number of the middle-sized interparticle pores is insufficient. Therefore, the capability of supplying the lubricating oil is not improved. On the other hand, if the number of the pores with the circle-equivalent, diameters of 45 to 63 μm is greater than 2.5% and the number of the pores with the circle-equivalent diameters of 63 to 75 μm is greater than 1.2%, with respect to the total number of the pores, respectively, the number of intercommunicating pores is increased. Therefore, the fluid permeability of the oil-impregnated sintered bearing is increased, and the noise level is undesirably increased.

The middle-sized interparticle pores are preferably formed so that the number of the pores with circle-equivalent diameters of 45 to 75 μm is adjusted. That is, it is preferable that the sum of the number of the pores with the circle-equivalent diameters of 45 to 63 μm and the number of the pores with the circle-equivalent diameters of 63 to 75 μm is within 1.3 to 3.0% of the total number of the pores. In this case, the fluid permeability of the oil-impregnated sintered bearing and the capability of supplying the lubricating oil are suitably balanced.

Even when the middle-sized interparticle pores are arranged thus, if large interparticle pores exist, the fluid permeability of the oil-impregnated sintered bearing is increased. Therefore, large pores with circle-equivalent diameters of larger than 75 μm are formed so as to be not more than 3% of the total number of the pores. The number of such large interparticle pores is preferably not more than 2% of the total number of the pores, and is more preferably not more than 1%.

As for the remainder of the total number of the pores, pores with circle-equivalent diameters of less than 45 μm are formed, which improve the oil-retaining characteristics of the oil-impregnated sintered bearing.

(2) Production Method for Oil-impregnated Sintered Bearing (2-1) Raw Powder

A mixed powder is used for the raw powder and is obtained by mixing a copper-phosphorus alloy powder, a copper powder, and at least one of a tin powder and a copper-tin alloy powder, with a porous iron powder. The porous iron powder has particles that include numerous microscopic pores and have spongelike appearances.

(2-2) Iron Powder

The porous iron powder disclosed in the patent document 2 is used for the iron powder. The porous iron powder is made of particles which have sizes of not more than 80 sieve mesh and which include numerous microscopic pores from the surface to the inside thereof and thereby have spongelike appearances. The porous iron powder has a specific surface area of 110 to 500 m$^2$/kg that is measured by the gas adsorption method (BET method, ISO 9277). If the specific surface area is less than 110 m$^2$/kg that is measured by the gas adsorption method, the iron powder particles include a small number of microscopic pores. Therefore, a sintered alloy that is obtained by using this iron powder includes an iron phase with a small number of microscopic pores, whereby the oil-retaining characteristics of an oil-impregnated sintered bearing is greatly decreased. On the other hand, if the specific surface area is greater than 500 m$^2$/kg, the iron powder tends to include a great number of fine particles. In this case, the interparticle pores are easily formed as closed pores, whereby the capability of supplying the lubricating oil is greatly degraded. For such porous iron powder, for example, "LD80" (specific surface area is approximately 200 m$^2$/kg), "P100" (specific surface area is approximately 175 m$^2$/kg), and "R12" (specific surface area is approximately 225 m$^2$/kg), which are manufactured by Höganäs AB, may be used.

(2-3) Copper-phosphorus Alloy Powder

The copper-phosphorus alloy powder is used for forming the middle-sized interparticle pores. By adding the copper-phosphorus alloy powder to the raw powder and compacting them into a green compact, the copper-phosphorus alloy powder particles are arranged inside the green compact. When the green compact is heated to not less than the temperature, at which a Cu-P eutectic liquid phase is generated, in sintering, a Cu-P eutectic liquid phase is generated from the copper-phosphorus alloy powder. The Cu-P eutectic liquid phase is infiltrated into spaces among the iron powder particles by capillary action and outflows. Accordingly, interparticle pores are formed at positions at which the copper-phosphorus alloy powder particles existed in the green compact. In general, a Cu-P alloy generates the Cu-P eutectic liquid phase at a temperature of not less than 714° C. when the alloy includes not less than 1.2 mass % and less than 13.99 mass % of P. In the present invention, in order to reliably form melt-off pores (Kirkendall voids) of the copper-phosphorus alloy powder particles and form interparticle pores of appropriate sizes, a special copper-phosphorus alloy powder is used. This copper-phosphorus alloy powder has a composition close to the eutectic composition (P: 8.38 mass %) and consists of 4 to 12 mass % of P and the balance of Cu and inevitable impurities.

The middle-sized interparticle pores include pores with sizes as described above, and in order to obtain such a pore size distribution, a copper-phosphorus alloy powder having a particle size distribution is used. The particle size distribution is such that the number of particles larger than 200 sieve mesh is not more than 4%, the number of particles smaller than 200 sieve mesh and larger than 240 sieve mesh is 2 to 10%, the number of particles smaller than 240 sieve mesh and larger than 325 sieve mesh is 10 to 50%, and particles smaller than 325 sieve mesh are the remainder. If any of the conditions of the particle size distribution are not satisfied, the above-described interparticle pores are difficult to obtain.

If the copper-phosphorus alloy powder is added to the raw powder at less than 3 mass %, the interparticle pores are insufficiently formed in the oil-impregnated sintered bearing by the copper-phosphorus alloy powder. As a result, the capability of supplying the lubricating oil of the oil-impregnated sintered bearing is degraded. On the other hand, if the copper-phosphorus alloy powder is added to the raw powder at greater than 8 mass %, the interparticle pores are excessively formed in the oil-impregnated sintered bearing by the copper-phosphorus alloy powder. Therefore, the fluid permeability of the oil-impregnated sintered bearing is increased. Accordingly, the copper-phosphorus alloy powder is added to the raw powder at 3 to 8 mass %. Since the copper-phosphorus alloy powder includes 4 to 12 mass % of P as described above, when it is added to the raw powder at 3 to 8 mass %, the amount of P in the raw powder is 0.12 to 0.96 mass %.

(2-4) Copper Powder

The amount of Cu is set to be 10 to 59 mass % in the raw powder. The reasons for limiting the amount of Cu are the same as those for the amount of Cu in the overall composition. Cu is added to the raw powder in the form of a copper powder at a predetermined amount other than the amount of Cu of the copper-phosphorus alloy powder and the amount of Cu of a copper-tin alloy powder, which will be described later.

The entire amount of the copper powder may be added in the form of a beaten-copper powder. When the copper powder is added in the form of the beaten-copper powder, the beaten-copper powder particles are arranged around the porous iron powder particles. Therefore, the amount of copper exposed at the inner circumferential surface of the bearing is increased for the amount, and the fluid permeability is decreased by blocking intercommunicating pores that exist at a small amount within the porous iron powder particles. On the other hand, the beaten-copper powder is more expensive than an electrolytic copper powder that is generally used. Accordingly, when a large amount of the copper powder is used, a part of the amount of the copper powder is preferably added in the form of the electrolytic copper powder in view of the cost. Even in this case, since the beaten-copper powder provides the above effects, the beaten-copper powder is preferably added in the raw powder at at least 2 mass %.

A part of the amount of the copper powder reacts with Sn and generates a Cu—Sn eutectic liquid phase, thereby facilitating the sintering. If a copper powder including large particles is used, large melt-off pores are formed due to outflow of the copper powder, and the fluid permeability may be increased. Therefore, a beaten-copper powder made of particles smaller than 100 sieve mesh is used. In a case of adding an electrolytic copper powder, an electrolytic copper powder made of particles smaller than 200 sieve mesh is used.

(2-5) At Least One of Tin Powder and Copper-tin Alloy Powder

Sn is added in the form of a powder of at least one of a tin powder and a copper-tin alloy powder. Since the amount of Sn is 1 to 3 mass % in the overall composition, at least one of the tin powder and the copper-tin alloy powder is added so that the amount of Sn is 1 to 3 mass % in the raw powder.

Sn generates the Cu—Sn eutectic liquid phase and thereby facilitates the sintering, and Sn alloys with Cu and thereby strengthens the copper alloy phase and improves the wear resistance of the copper alloy phase. In order to uniformly provide these effects in the sintered alloy, fine powder particles smaller than 325 sieve mesh are used for the tin powder and the copper-tin alloy powder. In the present invention, the middle-sized interparticle pores are formed by the copper-phosphorus alloy powder. However, if the tin powder and the copper-tin alloy powder have larger sizes, middle-sized interparticle pores are also formed by melt-off pores due to outflows of these powders, whereby it is difficult to control the pore size distribution. In view of this, as described above, the fine powder particles smaller than 325 sieve mesh are used for the tin powder and the copper-tin alloy powder.

When the copper-tin alloy powder is used, since it is necessary to generate a liquid phase at a sintering temperature, a copper-tin alloy powder including not less than 50 mass % of Sn must be used.

In the case of adding at least one of Zn and Ni to the composition of the sintered alloy, Zn and Ni are added in the form of copper alloy powders. This is because Zn easily vaporizes in the sintering when added in the form of a single powder, and Ni is not easily diffused to the copper alloy phase when added in the form of a single powder. As described above, in the case of adding at least one of Zn and Ni, they are added so as to be not more than 5 mass % in the overall composition. Therefore, a copper-zinc alloy powder and a copper-nickel alloy powder are added so that the amounts of Zn and Ni are not more than 5 mass % in the composition of the raw powder. When at least one of these copper alloy powders is used, the amount of the copper powder must be adjusted according to the amount of Cu included in these copper alloy powders.

(2-6) Compacting

The raw powder is compacted by a die assembly and is formed into a green compact with an approximately cylindrical shape, as in the case of a production of an ordinary oil-impregnated sintered bearing. The die assembly includes a die, an upper punch, a lower punch, and a core rod. The die has a hole for forming an outer circumferential shape of the green compact. The upper punch forms an upper end surface of the green compact. The lower punch forms a lower end surface of the green compact. The core rod forms an inner circumferential shape of the green compact. The die, the lower punch, and the core rod form a die cavity. The raw powder is filled into the die cavity and is compacted by the upper punch and the lower punch so as to have a compact density of 5.5 to 6.8 $Mg/m^3$, which is similar to that of an ordinary oil-impregnated sintered bearing. In the present invention, the raw powder includes the porous iron powder as the iron powder, which has lower apparent density than that of an ordinary atomized iron powder. Therefore, smaller spaces are formed among the powder particles compared with the spaces among the powder particles of a green compact for an ordinary oil-impregnated sintered bearing.

(2-7) Sintering

The green compact is heated and is sintered in a non-oxidizing atmosphere as in the case of the production of an ordinary oil-impregnated sintered bearing. If the sintering temperature is less than 760° C., the sintering reaction does not sufficiently proceed, whereby the strength of the sintered compact is decreased. On the other hand, if the sintering temperature is greater than 810°C., the Cu—Sn eutectic liquid phase is excessively generated. As a result, the Cu—Sn eutectic liquid phase infiltrates the interparticle pores that are formed by the copper-phosphorus alloy powder, whereby a predetermined pore size distribution is difficult to obtain. Therefore, the sintering is performed at a sintering temperature of 760 to 810° C.

(3) Other Embodiments

As in the case of a conventional oil-impregnated sintered bearing, at least one kind of solid lubricant component may be added in the above oil-impregnated sintered bearing. The solid lubricant component may be selected from the group consisting of graphite, molybdenum disulfide, manganese sulfide, and calcium fluoride. When these solid lubricant components are used, frictional coefficient between a shaft and the oil-impregnated sintered bearing during sliding is decreased. These solid lubricant components do not react with the iron phase and the copper alloy phase of the sintered alloy and disperse into the interparticle pores. In this case, if the total amount thereof is less than 0.2 mass parts with respect to 100 mass parts of the iron-copper sintered alloy, the effects are small. On the other hand, if the total amount of these solid lubricant components is greater than 2 mass parts, the strength of the bearing is greatly decreased. Therefore, in the case of using the solid lubricant components, the total amount thereof is set to be 0.2 to 2 mass parts with respect to 100 mass parts of the iron-copper sintered alloy. In this case, powders of solid lubricant components are added at a total of 0.2 to 2 mass parts with respect to 100 mass parts of the raw powder.

In the production method for the oil-impregnated sintered bearing, as in the case of a conventional oil-impregnated sintered bearing, the sintered compact may be subjected to a recompressing treatment for correcting the dimensions of the bearing, such as sizing, after the sintering. In addition, the sintered compact may be subjected to a recompressing treatment for providing a taper to the inner circumferential surface of the bearing, such as one disclosed in Japanese Examined Patent Publication No. 63-067047.

EXAMPLES

1. First Example

The following powders (1) to (5) were prepared for raw powders.
(1) Iron powder: specific surface area was approximately 200 $m^2/kg$, particle sizes were smaller than 80 sieve mesh
(2) Electrolytic copper powder: particles smaller than 145 sieve mesh and larger than 350 sieve mesh were included at 80 to 90 mass %
(3) Beaten-copper powder: particles smaller than 100 sieve mesh and larger than 350 sieve mesh were included at 35 to 55 mass %
(4) Tin powder: particle sizes were smaller than 325 sieve mesh
(5) Copper-phosphorus alloy powder The particles of the copper-phosphorus alloy powder (5) were classified into four classes by using a sieve of 200 mesh, a sieve of 240 mesh, and a sieve of 325 mesh. Then, particles larger than 200 sieve mesh, particles smaller than 200 sieve mesh and larger than 240 sieve mesh, particles smaller than 240 sieve mesh and larger than 325 sieve mesh, and particles smaller than 325 sieve mesh, were obtained. These four kinds of particles were mixed at a ratio shown in Table 1, and copper-phosphorus alloy powders having different particle size distributions were formed. In Table 1, the symbol "-#nnn" represents particles smaller than nnn sieve mesh, and the symbol "+#mmm" represents particles larger than mmm sieve mesh.

The iron powder was mixed with 4 mass % of the copper-phosphorus alloy powder having the particle size distribution shown in Table 1, 44 mass % of the electrolytic copper powder, 4.5 mass % of the beaten-copper powder, and 2 mass % of the tin powder, whereby mixed powders were obtained. Moreover, the mixed powders were mixed with 0.6 mass parts of a zinc stearate powder of a forming lubricant with respect to 100 mass parts of the mixed powder, whereby raw powders were prepared.

The raw powders were compacted into green compacts with a compact density of 6.4 $Mg/m^2$, and the green compacts were heated to 790° C. and were sintered in a decomposed ammonia gas atmosphere, whereby cylindrical sintered compacts were formed. The sintered compacts had an outer diameter of 10.30 mm, an inner diameter of 7.31 mm, and a height of 6.63 mm. The cylindrical sintered compacts were recompressed at the same pressure by a recompression die assembly having the same shape, as those used in the above compacting step, so as to have an outer diameter of 10.22 mm, an inner diameter of 7.32 mm, and a height of 6.50 mm. Thus, sintered compact samples of samples Nos. 01 to 12 were formed.

Each of the sintered compact samples was cut in the axial direction, and the inner circumferential surface thereof was observed by an optical microscope. Meanwhile, a total number of pores, a circle-equivalent diameter of each pore, and a pore size distribution, were measured by image analyzing software ("Quick Grain Standard Video" manufactured by Inotech Co., Ltd.). In addition, ratios of the amounts of pores that were classified into four sizes shown in Table 1 to the total number of the pores were investigated. These results are also shown in Table 1.

The sintered compact samples were vacuum impregnated with a lubricating oil (ANDEROL® 465 manufactured by ANDEROL Inc.), and samples of oil-impregnated sintered bearings were formed. Each of the samples of oil-impregnated sintered bearings was mounted as a bearing for a shaft in an electric motor, and frictional coefficient was measured by driving the electric motor at room temperature (25° C.). The results of the frictional coefficient measurement are also shown in Table 1. The electric motor had a shaft with a diameter of 7.29 mm and a PV factor of 110 MPa·m/min and was driven at a sliding rate of 101 m/min.

larger than 324 sieve mesh must be 10 to 50 mass % in the copper-phosphorus alloy powder.

The total number of pores was greatest in the sample of the sample No. 01. In the sample of the sample No. 01, the copper-phosphorus alloy powder did not include the particles smaller than 200 sieve mesh and larger than 240 sieve mesh and the particles smaller than 240 sieve mesh and larger than 325 sieve mesh but was primarily made of particles smaller than 325 sieve mesh. The total number of

TABLE 1

| No. | Particle size distribution in copper-phosphorus alloy powder mass % | | | | Total number of pores/ mm² | Ratio of amount of pores to total number of pores % | | | | Frictional coefficient |
|---|---|---|---|---|---|---|---|---|---|---|
| | +#200 | -#200 +#240 | -#240 +#325 | -#325 | | 75 µm or larger | 63 to 75 µm | 45 to 63 µm | 45 µm or smaller | |
| 01 | 2.0 | 0.0 | 0.0 | 98.0 | 2400 | 0.6 | 0.0 | 0.1 | 99.3 | 0.16 |
| 02 | 2.0 | 1.0 | 17.0 | 80.0 | 1990 | 0.6 | 0.05 | 1.2 | 98.1 | 0.15 |
| 03 | 2.0 | 2.0 | 17.0 | 79.0 | 1970 | 0.6 | 0.1 | 1.2 | 98.1 | 0.11 |
| 04 | 2.0 | 5.0 | 17.0 | 76.0 | 1900 | 0.6 | 0.5 | 1.2 | 97.7 | 0.10 |
| 05 | 2.0 | 10.0 | 17.0 | 71.0 | 1790 | 0.6 | 1.2 | 1.2 | 97.0 | 0.12 |
| 06 | 2.0 | 15.0 | 17.0 | 66.0 | 1670 | 0.6 | 1.4 | 1.2 | 96.8 | 0.15 |
| 07 | 2.0 | 5.0 | 5.0 | 88.0 | 2180 | 0.6 | 0.5 | 0.4 | 98.5 | 0.15 |
| 08 | 2.0 | 5.0 | 10.0 | 83.0 | 2060 | 0.6 | 0.5 | 0.9 | 98.0 | 0.11 |
| 04 | 2.0 | 5.0 | 17.0 | 76.0 | 1900 | 0.6 | 0.5 | 1.2 | 97.7 | 0.10 |
| 09 | 2.0 | 5.0 | 20.0 | 73.0 | 1890 | 0.6 | 0.5 | 1.3 | 97.6 | 0.11 |
| 10 | 2.0 | 5.0 | 30.0 | 63.0 | 1600 | 0.6 | 0.5 | 1.7 | 97.2 | 0.12 |
| 11 | 2.0 | 5.0 | 50.0 | 43.0 | 1140 | 0.6 | 0.5 | 2.5 | 96.4 | 0.12 |
| 12 | 2.0 | 5.0 | 60.0 | 33.0 | 910 | 0.6 | 0.5 | 2.9 | 96.0 | 0.15 |

According to the results of the samples Nos. 01 to 06 in Table 1, by adjusting the number of the particles smaller than 200 sieve mesh and larger than 240 sieve mesh, the ratio of the pores with circle-equivalent diameters of 63 to 75 µm was controlled. In the samples of the oil-impregnated sintered bearings of the samples Nos. 03 to 05 including 0.1 to 1.2% of the pores with circle-equivalent diameters of 63 to 75 µm, the frictional coefficient was in a range of 0.10 to 0.12 and was low, and metallic contacts were prevented. On the other hand, in the samples of the oil-impregnated sintered bearings of the samples Nos. 01, 02 and 06, the number of the pores with circle-equivalent diameters of 63 to 75 µm was outside the range of 0.1 to 1.2%. In these samples, the frictional coefficient was 0.15 or greater and was high, and metallic contacts occurred. In order to set the ratio of the pores with circle-equivalent diameters of 63 to 75 µm to be 0.1 to 1.2%, the number of the particles smaller than 200 sieve mesh and larger than 240 sieve mesh must be 2 to 10 mass % in the copper-phosphorus alloy powder.

According to the results of the samples Nos. 04 and 07 to 12 in Table 1, by adjusting the number of particles smaller than 240 sieve mesh and larger than 325 sieve mesh in the copper-phosphorus alloy powder, the ratio of pores with circle-equivalent diameters of 45 to 63 µm was controlled. In the samples of the oil-impregnated sintered bearing of the samples Nos. 04 and 08 to 11 including 0.9 to 2.5% of pores with circle-equivalent diameters of 45 to 63 µm, the frictional coefficient was in a range of 0.10 to 0.12 and was low, and the metallic contacts were prevented. On the other hand, in the samples of the oil-impregnated sintered bearings of the samples Nos. 07 and 12, the number of the pores with circle-equivalent diameters of 45 to 63 µm was without the range of 0.9 to 2.5%. In these samples, the frictional coefficient was 0.15 or was high, and metallic contacts occurred. In order to set the ratio of the pores with circle-equivalent diameters of 45 to 63 µm to be 0.9 to 2.5%, the number of the particles smaller than 240 sieve mesh and the pores was decreased with the increases of the particles smaller than 200 sieve mesh and larger than 240 sieve mesh and the particles smaller than 240 sieve mesh and larger than 325 sieve mesh. In particular, in this case, the effect of the increase of the latter particles was greater than that of the increase of the former particles. In all of the samples of the oil-impregnated sintered bearings, although the copper-phosphorus alloy powder included four kinds of particles at various ratios, the total number of the pores was not less than 800 per mm². Accordingly, the increase of the frictional coefficient was not affected by the open porosity (oil-retaining characteristics) but was affected by the ratio of the pores with circle-equivalent diameter of 45 to 75 µm, that is, by the capability of supplying the lubricating oil.

2. Second Example

Other raw powders including different amounts of the copper-phosphorus alloy powder were formed. In this case, the copper-phosphorus alloy powder had the particle size distribution of the sample No. 04 in the First Example. In these raw powders, only the amount of the copper-phosphorus alloy powder was changed, and the amounts of the other powders were the same as in the case of the First Example. These raw powders were compacted, sintered, and recompressed, as in the case of the First Example, whereby sintered compact samples of samples Nos. 13 to 18 were formed. In these sintered compact samples, the total number of pores, and the ratios of the amounts of the pores that were classified into four sizes to the total number of the pores were investigated as in the case of the First Example.

These results are shown in Table 2. Moreover, in these sintered compact samples, frictional coefficient at room temperature (25° C.) was measured as in the case of the First Example. The measured results of the frictional coefficients are also shown in Table 2. The values of the sample of the sample No. 04 in the First Example are also shown in Table 2.

TABLE 2

| | | Mixing ratio mass % | | | | Total number of pores/mm² | Ratio of amount of pores to total number of pores % | | | | |
|---|---|---|---|---|---|---|---|---|---|---|---|
| | | | Copper powder | | | | | | | | |
| No. | Iron powder | Copper-phosphorus alloy powder | Beaten-copper powder | Electrolytic copper powder | Tin powder | | 75 μm or larger | 63 to 75 μm | 45 to 63 μm | 45 μm or smaller | Frictional coefficient |
| 13 | Bal. | 0.0 | 4.5 | 44.0 | 2.0 | 2800 | 0.0 | 0.0 | 0.1 | 99.9 | 0.16 |
| 14 | Bal. | 1.0 | 4.5 | 44.0 | 2.0 | 2400 | 0.1 | 0.3 | 0.3 | 99.3 | 0.15 |
| 15 | Bal. | 3.0 | 4.5 | 44.0 | 2.0 | 2100 | 0.5 | 0.4 | 0.9 | 98.2 | 0.10 |
| 04 | Bal. | 4.0 | 4.5 | 44.0 | 2.0 | 1900 | 0.6 | 0.5 | 1.2 | 97.7 | 0.10 |
| 16 | Bal. | 6.0 | 4.5 | 44.0 | 2.0 | 1200 | 0.9 | 0.8 | 1.8 | 96.5 | 0.11 |
| 17 | Bal. | 8.0 | 4.5 | 44.0 | 2.0 | 800 | 1.2 | 1.0 | 2.4 | 95.4 | 0.12 |
| 18 | Bal. | 10.0 | 4.5 | 44.0 | 2.0 | 760 | 1.5 | 1.3 | 3.0 | 94.2 | 0.15 |

According to the results shown in Table 2, in the oil-impregnated sintered bearing of the sample No. 13 without the copper-phosphorus alloy powder, very fine pores with circle-equivalent diameters of not more than 45 μm were primarily included. Therefore, the open porosity was high, and the oil-retaining characteristics were high. However, since the middle-sized pores for supplying the lubricating oil were not sufficiently included, an oil film was not sufficiently formed, whereby the frictional coefficient was high. The oil-impregnated sintered bearing of the sample No. 13 corresponds to the oil-impregnated sintered bearing disclosed in the patent document 2. In the oil-impregnated sintered bearing of the sample No. 14 including 1 mass % of the copper-phosphorus alloy powder, the ratios of the pores with circle-equivalent diameters of 45 to 63 μm and the pores with circle-equivalent diameters of 63 to 75 μm were very small. Therefore, an oil film was not sufficiently formed, whereby the frictional coefficient was high.

On the other hand, in the sample of the sample No. 15 including 3 mass % of the copper-phosphorus alloy powder, the ratios of the pores with circle-equivalent diameters of 45 to 63 μm and the pores with circle-equivalent diameters of 63 to 75 μm were in appropriate ranges. Therefore, in this sample, the lubricating oil was sufficiently supplied, and a reliable oil film was formed between the shaft and the inner circumferential surface of the bearing, whereby the frictional coefficient was low. According to the increase in the amount of the copper-phosphorus alloy powder, the ratios of the pores with circle-equivalent diameters of 45 to 63 μm and the pores with circle-equivalent diameters of 63 to 75 μm were increased. Meanwhile, the total number of the pores was decreased because the Cu-P liquid phase was generated by the copper-phosphorus alloy powder and infiltrated the very fine pores. Nevertheless, the total number of the pores was not less than 800 per mm² and was sufficient until the amount of the copper-phosphorus alloy powder was 8 mass %. As a result, when the amount of the copper-phosphorus alloy powder was 3 to 8 mass %, the frictional coefficient was 0.10 to 0.12 and was maintained to be low.

On the other hand, in the oil-impregnated sintered bearing of the sample No. 18 including the copper-phosphorus alloy powder at greater than 8 mass %, the total number of the pores was less than 800 per mm², whereby the oil-retaining characteristics were low. Moreover, the ratios of the pores with circle-equivalent diameters of 45 to 63 μm and the pores with circle-equivalent diameters of 63 to 75 μm were too great, whereby the fluid permeability was increased, and the oil pressure was decreased. Accordingly, an oil film was not maintained, and the metallic contacts occurred, whereby the frictional coefficient was increased to 0.15.

3. Third Example

Other raw powders including different amounts of the copper powder were formed. In this case, the copper-phosphorus alloy powder having the particle size distribution of the sample No. 04 in the First Example was used. In these raw powders, only the amount of the electrolytic copper powder was changed, and the amounts of the other powders were the same as in the case of the First Example. These raw powders were compacted into green compacts by a core rod, which had different dimensions from those of a core rod used in the First Example, so as to have the same dimensions as those of the sintered compacts in the First Example by sintering. The green compacts were sintered as in the case of the First Example, whereby cylindrical sintered compacts having the same dimensions as those of the sintered compacts in the First Example were formed. The sintered compacts were recompressed as in the case of the First Example so as to have the same recompressed amount as that in the First Example, and sintered compact samples of samples Nos. 19 to 25 were formed. In these sintered compact samples, the total number of pores, the ratios of the amounts of the pores that were classified into four sizes to the total number of the pores were investigated as in the case of the First Example. These results are shown in Table 3. Moreover, in these sintered compact samples, frictional coefficient at room temperature (25° C.) was measured as in the same manner as in the First Example. These results are also shown in Table 3. The values of the sample of the sample No. 04 in the First Example are also shown in Table 3.

TABLE 3

| | Mixing ratio mass % | | | | | Overall composition mass % | | | | Total number of pores/ mm² | Ratio of amount of pores to total number of pores % | | | | Frictional coefficient |
|---|---|---|---|---|---|---|---|---|---|---|---|---|---|---|---|
| | | Copper- phosphorus | Copper powder | | | | | | | | 75 μm or | 63 to | 45 to | 45 μm or | |
| No. | Iron powder | alloy powder | Beaten- copper powder | Electrolytic copper powder | Tin powder | Fe | Cu | P | Sn | | larger | 75 μm | 63 μm | smaller | |
| 19 | Bal. | 4.0 | 4.5 | 0.0 | 2.0 | Bal. | 8.2 | 0.3 | 2.0 | 2800 | 0.4 | 0.4 | 0.8 | 98.4 | 0.15 |
| 20 | Bal. | 4.0 | 4.5 | 1.8 | 2.0 | Bal. | 10.0 | 0.3 | 2.0 | 2600 | 0.5 | 0.4 | 0.8 | 98.3 | 0.13 |
| 21 | Bal. | 4.0 | 4.5 | 11.8 | 2.0 | Bal. | 20.0 | 0.3 | 2.0 | 2400 | 0.5 | 0.4 | 0.9 | 98.2 | 0.12 |
| 22 | Bal. | 4.0 | 4.5 | 21.8 | 2.0 | Bal. | 30.0 | 0.3 | 2.0 | 2200 | 0.5 | 0.5 | 1.0 | 98.0 | 0.11 |
| 23 | Bal. | 4.0 | 4.5 | 31.8 | 2.0 | Bal. | 40.0 | 0.3 | 2.0 | 2100 | 0.6 | 0.5 | 1.0 | 97.9 | 0.11 |
| 04 | Bal. | 4.0 | 4.5 | 44.0 | 2.0 | Bal. | 52.2 | 0.3 | 2.0 | 1900 | 0.6 | 0.5 | 1.2 | 97.7 | 0.10 |
| 24 | Bal. | 4.0 | 4.5 | 51.8 | 2.0 | Bal. | 60.0 | 0.3 | 2.0 | 900 | 1.3 | 1.1 | 2.4 | 95.2 | 0.11 |
| 25 | Bal. | 4.0 | 4.5 | 60.0 | 2.0 | Bal. | 68.2 | 0.3 | 2.0 | 700 | 1.7 | 1.4 | 3.1 | 93.8 | 0.15 |

As shown in Table 3, in the oil-impregnated sintered bearing of the sample No. 19 including less than 10 mass % of Cu in the overall composition, the copper alloy phase for improving adaptability to the shaft was insufficient, whereby the frictional coefficient was 0.15 and was high.

On the other hand, in the oil-impregnated sintered bearing of the sample No. 20 including 10 mass % of Cu in the overall composition, the amount of the copper alloy phase was sufficient, whereby the frictional coefficient was decreased to 0.13. According to the increase in the amount of Cu in the overall composition, the amount of the copper alloy phase was increased. Therefore, when the amount of Cu in the overall composition was further increased, the adaptability of the oil-impregnated sintered bearing to the shaft was increased, whereby the frictional coefficient was 0.10 to 0.12 and was maintained to be low. Meanwhile, according to the increase in the amount of Cu, the amount of the iron phase was decreased, and therefore, the total number of the pores was decreased. Nevertheless, the total number of the pores was not less than 800 per mm² and was sufficient until the amount of Cu in the overall composition was 60 mass %.

On the other hand, in the oil-impregnated sintered bearing of the sample No. 25 including Cu at greater than 60 mass % in the overall composition, the amount of Cu was excessive, whereby the total number of the pores was less than 800 per mm², and the oil-retaining characteristics were low. Moreover, the ratios of the pores with circle-equivalent diameters of 45 to 63 μm and the pores with circle-equivalent diameters of 63 to 75 μm were too great, whereby the fluid permeability was increased, and the oil pressure was decreased. As a result, an oil film was not maintained, and the metallic contacts occurred, whereby the frictional coefficient was increased to 0.15.

The oil-impregnated sintered bearing of the present invention is suitably used for a bearing of an electric motor that may be intermittently used for a short time, such as a bearing of a window regulator motor for an automobile.

What is claimed is:

1. An oil-impregnated sintered bearing made of an iron-copper sintered alloy which consists of, by mass %, 10 to 59% of Cu, 1 to 3% of Sn, 0.12 to 0.96% of P, 5% or less of at least one of Zn and Ni as an optional element, and the balance of Fe and inevitable impurities, wherein:
  the oil-impregnated sintered bearing includes pores in a matrix of the iron-copper sintered alloy at a total of not less than 800 per mm²,
  the oil-impregnated sintered bearing has an inner circumferential surface at which the pores are exposed at 20 to 50% area ratio, and has a fluid permeability of $1 \times 10^{-11}$ cm² to $30 \times 10^{-11}$ cm², and
  the oil-impregnated sintered bearing exhibits a pore size distribution in which:
    the number of pores with circle-equivalent diameters of larger than 75 μm is not more than 3% with respect to the total number of the pores,
    the number of pores with circle-equivalent diameters of 63 to 75 μm is 0.1 to 1.2% with respect to the total number of the pores,
    the number of pores with circle-equivalent diameters of 45 to 63 μm is 0.9 to 2.5% with respect to the total number of the pores, and
    the remainder of the pores are pores with circle-equivalent diameters of less than 45 μm.

2. The oil-impregnated sintered bearing according to claim 1, wherein the iron-copper alloy includes at least one of Zn and Ni.

3. The oil-impregnated sintered bearing according to claim 1, wherein at least one kind of solid lubricant component selected from the group consisting of graphite, molybdenum disulfide, manganese sulfide, and calcium fluoride is dispersed in the pores in the matrix of the iron-copper sintered alloy at 0.2 to 2 mass parts with respect to 100 mass parts of the iron-copper sintered alloy.

4. A production method for an oil-impregnated sintered bearing, comprising:
  preparing a raw powder by mixing:
    an iron powder made of porous iron particles and having a specific surface area of 110 to 500 m²/kg as measured by a gas adsorption method, the porous iron particles including numerous microscopic pores from a surface to an inside thereof and having spongelike appearances, and the porous iron particles being smaller than 80 sieve mesh,
    a copper powder made of beaten-copper particles smaller than 100 sieve mesh, or made of not less than 2 mass % of the beaten-copper particles and the remainder of electrolytic copper particles smaller than 200 sieve mesh,
    a copper-phosphorus alloy powder consisting of 4 to 12 mass % of P and the balance of Cu and inevitable impurities and having a particle size distribution so as to consist of not more than 4% of particles larger than 200 sieve mesh, 2 to 10% of particles smaller than 200 sieve mesh and larger than 240 sieve mesh, 10 to 50% of particles smaller than 240 sieve mesh and larger than 325 sieve mesh, and particles smaller than 325 sieve mesh as the remainder, and at least one of a tin powder, a copper-tin alloy powder, a copper-zinc alloy powder, and a copper-nickel alloy powder, the tin powder and the copper-tin alloy powder being made of particles smaller than 325 sieve mesh;

compacting the raw powder into a green compact with a density of 5.5 to 6.8 Mg/m$^3$ and with an approximately cylindrical shape; and sintering the green compact at a sintering temperature of 760 to 810° C, wherein the raw powder consists of, by mass %, 10 to 59% of Cu, 1 to 3% of Sn, 0.12 to 0.96% of P, 5% or less of at least one of Zn and Ni as an optional element, and the balance of Fe and inevitable impurities.

5. The production method for the oil-impregnated sintered bearing according to claim 4, wherein at least one powder of solid lubricant component is added at 0.2 to 2 mass parts with respect to 100 mass parts of the raw powder, and the powder of the solid lubricant component is selected from the group consisting of a graphite powder, a molybdenum disulfide powder, a manganese sulfide powder, and a calcium fluoride powder.

6. An oil-impregnated sintered bearing made of an iron-copper sintered alloy which consists of, by mass %, 10 to 59% of Cu, 1 to 3% of Sn, 0.12 to 0.96% of P, 5% or less of at least one of Zn and Ni as an optional element, and the balance of Fe and inevitable impurities, wherein:

the oil-impregnated sintered bearing includes pores in a matrix of the iron-copper sintered alloy at a total of not less than 800 per mm$^2$, the oil-impregnated sintered bearing, has an inner circumferential surface at which the pores are exposed at 20 to 50% area ratio, and has a fluid permeability of $1\times10^{-11}$ cm$^2$ to $30\times10^{-11}$ cm$^2$, and the oil-impregnated sintered bearing exhibits a pore size distribution in which:

the number of pores with circle-equivalent diameters of larger than 75 μm is not more than 3% with respect to the total number of the pores, the number of pores with circle-equivalent diameters of 63 to 75 μm is 0.4 to 1.2% with respect to the total number of the pores, the number of pores with circle-equivalent diameters of 45 to 63 μm is 0.9 to 2.5% with respect to the total number of the pores, and the remainder of the pores are pores with circle-equivalent diameters of less than 45 μm.

* * * * *